UNITED STATES PATENT OFFICE.

STEPHEN O. O'DELL, OF DETROIT, MICHIGAN.

SALVE.

1,426,002.   Specification of Letters Patent.   Patented Aug. 15, 1922.

No Drawing.   Application filed August 6, 1920.   Serial No. 401,664.

*To all whom it may concern:*

Be it known that I, STEPHEN O. O'DELL, a citizen of the United States of America, residing at Detroit, in the county of Wayne and State of Michigan, have invented certain new and useful Improvements in Salves, of which the following is a specification.

This invention relates to salves and has for its object to produce a highly efficient remedy for healing flesh injured by burns, bruises or cuts, or affected by those diseases or disorders caused by bacterial infection or parasitic invasion.

An incidental object to be achieved by my invention is to utilize the valuable curative properties of certain ingredients while at the same time restraining or preventing deleterious effects which would be produced if the ordinary action of such ingredients were not modified by the presence of other substances.

The salve contains the following substances in substantially the proportions given:—

| | |
|---|---|
| Red precipitate | 1 ounce |
| Carbolic acid | ½ ounce |
| Oil of origanum | 1 ounce |
| Oil of spike | 2 ounces |
| Rosin | 1 ounce |
| Beeswax | 4 ounces |
| Lard | 8 ounces |

The resin is powdered and melted with the beeswax and lard. The red precipitate (red mercury monoxid) is reduced to a very fine powder and added to the melted wax, lard and rosin, and the oils and carbolic acid are stirred in until the entire mass has been thoroughly blended.

The salve thus prepared has a consistency such that it will not become liquid in ordinary warm weather, but at the same time, it is soft enough to spread readily upon a wounded or raw surface of the skin. It is applied in use over and around the sore or injured place, and in the case of blood poisoning, it is applied between the injured place and the heart. For example, if a finger develops a case of blood poisoning that begins to extend along the forearm, a band of this salve applied thickly around the arm will in most cases stop the progress of the infection.

This preparation was developed primarily as a cure for galls, those sores produced as abrasions or excoriations by saddle or harness on horses. Any scab that forms in such a sore is rubbed off at once if the horse is worked with the harness or saddle that produced the sore. This salve renders the wound sterile so that it heals from the bottom up even though the surface is made raw each day by the pressure of the collar or other part producing the irritation. Galls have been healed by this salve on the shoulder of the center horse in a gang plow team. It heals up old sores that have resisted other treatments, such as running sores and indolent ulcers.

The phenol in the commercial carbolic acid used is well known as an antiseptic, and the oils are also antiseptic as well as tissue-penetrating. The oil of spike not only acts as an antiseptic, but also aids in allaying inflammation and in carrying the phenol and red precipitate into the tissues. Bacteria such as cause suppuration are checked in their growth, and the phagocytosis that ordinarily is relatively slow in certain boils and carbuncles is hastened or facilitated in some manner by some of the ingredients of this preparation or by the joint action of two or more of them, with the result that boils, carbuncles, and felons are quickly aborted or "brought to a head." The efficacy of resin in ointments for the treatment of the peculiar inflammation resulting from a burn or scald has long been known, and the present salve has all the valued qualities of the old ceratum resinæ of the U. S. P. in addition to its antiseptic qualities.

The fungus parasite causing ringworm appears to be inhibited in its growth by some one or more of the ingredients of this salve, and the sore produced by the parasite quickly heals when this salve is applied.

It has also been found to relieve the irritation and blistering caused by poison ivy.

I am aware that red mercuric oxide has long been used in the ointment known as unguentum hyrdargyrum oxidum rubrum formerly an official preparation, but dropped from the U. S. P. in its ninth revision, this being an indication that the preparation was considered inferior to others, the similar ointment in which the yellow oxide is used being substituted therefor. But this old red precipitate ointment did not have the composition or the properties of my present preparation. It consisted of red oxide 10 parts; water, 10 parts; hydrous wool-fat, 40 parts; and petrolatum, 40 parts, the last ingredient being one that is common in ointments, but which would practically render them useless in many cases.

This preparation has been carefully worked out by a long series of tests and experiments, and the present proportions are not the result of chance or guess-work. This is not a "doctor's prescription" or a theoretical formula, but is the tried and approved result of actual experience.

I claim:

1. An ointment comprising in combination, carbolic acid, red oxid of mercury, oil of spike, and oil of origanum.

2. An ointment comprising in combination, carbolic acid, red oxid of mercury, oil of spike, oil of origanum, rosin, beeswax and lard.

3. An ointment comprising in combination, the following ingredients in the proportions named: carbolic acid, 1 part; red oxid of mercury, 2 parts; rosin, 2 parts; oil or origanum, 2 parts; oil of spike, 4 parts; beeswax, 8 parts; and lard 16 parts.

In testimony whereof I affix my signature in presence of two witnesses.

STEPHEN O. O'DELL.

Witnesses:
ARTHUR MINNICK,
ANNA M. DORR.